(12) United States Patent
Morgan et al.

(10) Patent No.: US 7,537,453 B2
(45) Date of Patent: May 26, 2009

(54) LIFE SIZE FURNITURE KIT

(76) Inventors: Matthew P. Morgan, 24 Upland Dr., Greenwich, CT (US) 06831; Sandra L. Morgan, 24 Upland Dr., Greenwich, CT (US) 06831

( * ) Notice: Subject to any disclaimer, the term of this patent is extended or adjusted under 35 U.S.C. 154(b) by 1026 days.

(21) Appl. No.: 10/795,288

(22) Filed: Mar. 9, 2004

(65) Prior Publication Data

US 2005/0202393 A1     Sep. 15, 2005

(51) Int. Cl.
G09B 25/00     (2006.01)
(52) U.S. Cl. ........................................ 434/80
(58) Field of Classification Search .................... 434/80
See application file for complete search history.

(56) References Cited

U.S. PATENT DOCUMENTS

| | | | | |
|---|---|---|---|---|
| 2,528,211 A | * | 10/1950 | Civkin et al. | 434/80 |
| 2,686,980 A | * | 8/1954 | Carter | 434/73 |
| 3,678,553 A | | 7/1972 | Hermelin | |
| 3,873,219 A | | 3/1975 | Pofferi | |
| 3,887,234 A | | 6/1975 | Curtis et al. | |
| 3,912,087 A | * | 10/1975 | Zeischegg | 211/194 |
| 3,973,854 A | * | 8/1976 | Gilbo et al. | 403/170 |
| 4,017,986 A | * | 4/1977 | Miller | 434/73 |
| 4,039,263 A | * | 8/1977 | Bassler | 403/218 |
| 4,129,975 A | * | 12/1978 | Gabriel | 52/655.2 |
| 4,183,154 A | * | 1/1980 | Dykes | 434/167 |
| 4,353,661 A | | 10/1982 | Ruther | |
| 4,368,998 A | | 1/1983 | Pestoor | |
| 4,626,218 A | * | 12/1986 | Wright | 434/73 |
| 4,664,550 A | | 5/1987 | Jachmann et al. | |
| 4,677,804 A | | 7/1987 | Holt | |
| 4,787,191 A | * | 11/1988 | Shima | 52/655.2 |
| 4,921,369 A | | 5/1990 | Chew, II et al. | |
| 4,991,333 A | * | 2/1991 | McLean et al. | 40/534 |
| 5,007,220 A | | 4/1991 | Lalvani | |
| 5,273,436 A | * | 12/1993 | Lord et al. | 434/302 |
| 5,499,882 A | * | 3/1996 | Waterhouse | 403/171 |
| 5,536,063 A | * | 7/1996 | Cable | 297/16.2 |
| 5,536,097 A | | 7/1996 | Hazan | |
| 5,549,408 A | | 8/1996 | Lo | |
| 5,598,790 A | * | 2/1997 | Fich | 108/158.11 |
| 5,636,491 A | | 6/1997 | Scharer et al. | |
| 5,678,706 A | * | 10/1997 | Husak et al. | 211/189 |
| 5,775,778 A | | 7/1998 | Riley et al. | |
| 5,918,998 A | | 7/1999 | Pourmand | |
| 5,983,420 A | | 11/1999 | Tilley | |
| 2002/0093235 A1 | | 7/2002 | Niederman et al. | |
| 2002/0105211 A1 | * | 8/2002 | Laughlin et al. | 297/36 |

FOREIGN PATENT DOCUMENTS

DE     40 06 836 A1     2/1992
DE     43 02 696 A1     9/1993

OTHER PUBLICATIONS http://www.crawleydesign.com, Oct. 2, 2003, 2 pp.

\* cited by examiner

*Primary Examiner*—Gene Kim
*Assistant Examiner*—Dolores Collins
(74) *Attorney, Agent, or Firm*—Richard C. Litman

(57) ABSTRACT

The life size furniture kit comprises an assortment of plastic tubular forms and fittings simulating household furniture and fixtures stored in a case for displaying a room furniture layout for a homeowner. An instruction manual illustrating common furniture dimension and a videotape showing the step-by-step instructions for placing the furniture and fixtures are supplied.

6 Claims, 8 Drawing Sheets

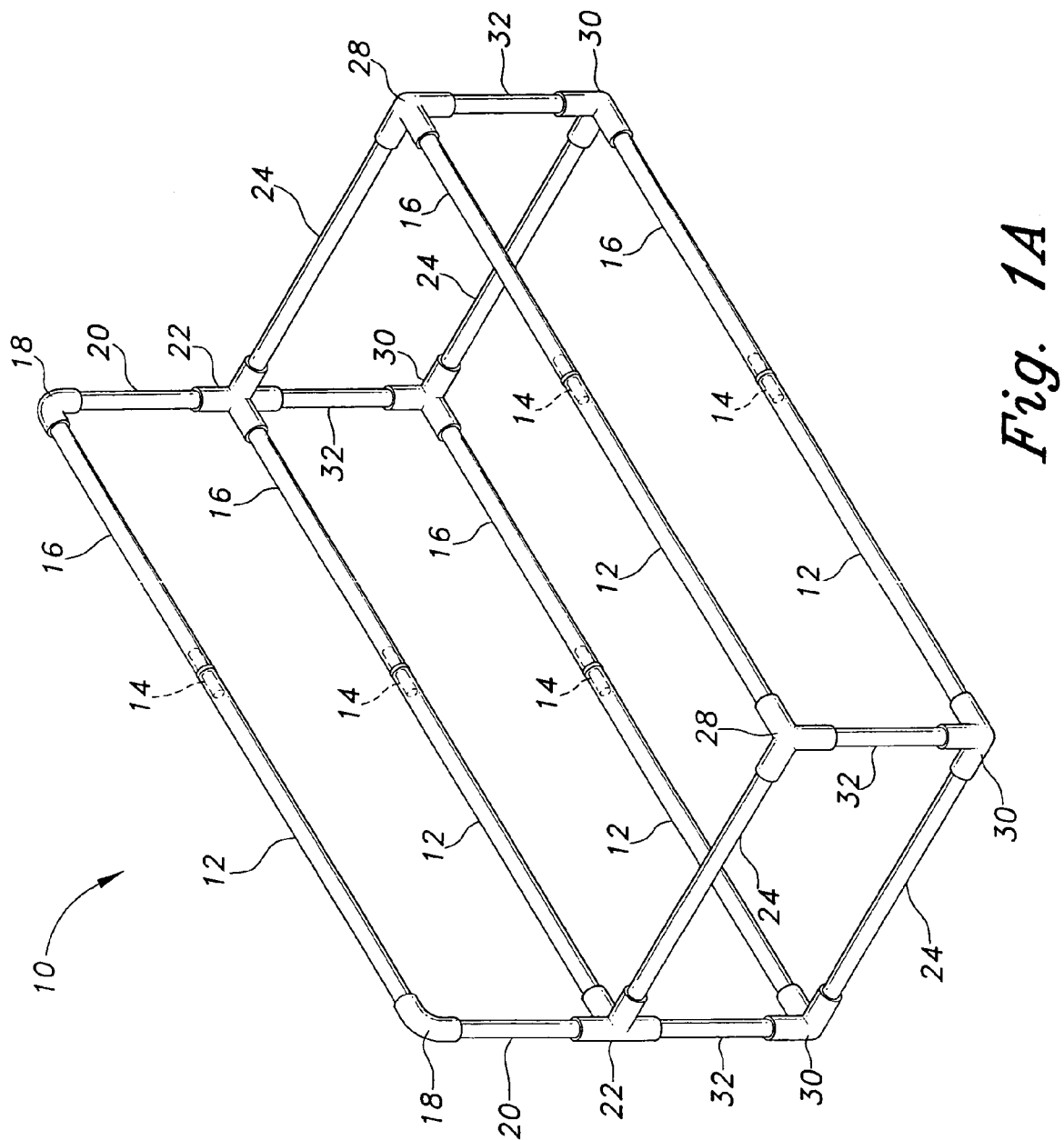

LIFE SIZE FURNITURE KIT

BACKGROUND OF THE INVENTION

1. Field of the Invention

The present invention relates generally to furniture. More specifically, the invention relates to a plastic tube forming furniture kit carried in a case to a prospective customer's house to display how various furniture and related pieces in full size would be positioned in a specific room.

2. Description of the Related Art

The related art of interest describes various plastic forms for forming furniture and the like, but none discloses the present invention. There is a need for a homeowner to visualize how various furniture pieces would be located in a room. The related art will be discussed in the order of perceived relevance to the present invention.

U.S. Pat. No. 4,353,661 issued on Oct. 12, 1982, to Hubert Ruther describes an exhibition/house furniture as well as a play and sport equipment comprising building elements which can be combined in any desired manner as its parts, namely plug connectors, connecting pipes, toggles, and plates. The positive plug connection between a connector socket of a plug connector and a pipe end of a connecting pipe of circular-cylindrical form so as to form a plug unit is secured in form logged (positive) fashion by a toggle. For inserting plates between parallel connecting pipes, clamp connections are provided. The apparatus is distinguishable for requiring specially configured rigid elements for combining parts to form a rigid structure.

U.S. Pat. No. 3,678,553 issued on Jul. 25, 1972, to Marc S. Hermelin describes a method of preparing an article of furniture from plastic foam comprises a layer of flexible urethane foam material folded to form furniture and held in shape by a positioning bar and/or adhesives. The furniture is distinguishable for requiring plastic foam material.

U.S. Pat. No. 5,775,778 issued on Jul. 7, 1998, to Paula Riley et al. describes a shape-adaptable and renewable furniture system by adding and removing modules and accessories to and from a base structure of wood, metal and plastic elements adapted to accept the modules and accessories. The system is distinguishable for requiring wood, metal and/or plastic elements covered with a muslin fabric.

U.S. Patent Application Publication No. U.S. 2002/0093235 A1 published on Jul. 18, 2002, for Alfred G. Niederman et al. describes a modular upholstered furniture construction that is distinguishable for requiring upholstery.

U.S. Patent Application Publication No. U.S. 2002/0105211 A1 published on Aug. 8, 2002, for Glenn M. Laughlin et al. describes a folding ready-to-assemble upholstered furniture which is distinguishable for requiring upholstery.

U.S. Pat. No. 3,873,219 issued on Mar. 25, 1975, to Giancarlo Pofferi describes a demountable metal scaffolding and the like structures formed by connecting a pair of co-axial spaced connection members. The structures are distinguishable for requiring the joining of scaffolding and the like.

U.S. Pat. No. 3,887,234 issued on Jun. 3, 1975, to William R. Curtis et al. describes a structural foam furniture subframe which is distinguishable for requiring a foam plastic subframe.

U.S. Pat. No. 3,912,087 issued on Oct. 14, 1975, to Walter Zeischegg describes a modular frame assembly for making furniture such as tables, shelves, and the like comprising a plurality of uniform cylindrical hollow post and beam bars made of extruded synthetic resin, and junction pieces with three projections for forming the corners. The assembly is distinguishable for requiring a synthetic resin frame.

U.S. Pat. No. 3,973,854 issued on Aug. 10, 1976, to Charles F. Gilbo et al. describes connectors for tubular framing members having a square cross-section which is distinguishable for being limited to joining framing members with the same cross-section.

U.S. Pat. No. 4,039,263 issued on Aug. 3, 1977, to Otto Bassler describes a spherical connector joint for connecting a plurality of cylindrical rods which is distinguishable for being limited to joining metal rods.

U.S. Pat. No. 4,129,975 issued on Dec. 19, 1978, to Richard J. Gabriel describes a construction set comprising a plurality of hollow 26 faceted metal joint elements with openings in each facet configured to receiving elongated struts for interconnecting a plurality of joint elements to form a three-dimensional framework. The construction set is distinguishable for requiring specific faceted joint elements.

U.S. Pat. No. 4,368,998 issued on Jan. 18, 1983, to James A. Pestoor describes a tube assembling device comprising a metal device for coupling or plugging hollow square tubing which is distinguishable for requiring metal connectors for metal parts.

U.S. Pat. No. 4,664,550 issued on May 12, 1987, to Rolf D. Jachmann et al. describes a junction piece for releasably connecting rod-shaped elements with one another having a junction ball and a pin element which is distinguishable for requiring metal ball and pin elements.

U.S. Pat. No. 4,677,804 issued on Jul. 7, 1987, to Richard E. Holt describes demountable frames for furniture comprising steel structural members extending between two fixed spaced steel members being fitted in place by the extension of projections at the ends of the structural member into the spaced members without moving the latter apart, and can be removed by reversing the process. The demountable frames are distinguishable for requiring metal elements.

U.S. Pat. No. 4,787,191 issued on Nov. 29, 1988, to Hiroshi Shima describes elements for constructing a three-dimensional structure comprising beams that make edges, polygonal plates that make faces, and joints with arms that connect the beams and/or polygonal plates with each other so that a structure is formed, wherein the ends of the joint arms is formed into a spherical shape and bearings which have a grasping menas and polygonal plates so that of said berings can be engaged or disengaged with it freely. The joints are formed into at least two shapes from an elastic material so that they can be used singly or in conjunction with the others in connecting said beams and/or polygonal plates, and hooks are provided to hold the beams by their sides. The joining devices are distinguishable by their unique polygonal shapes.

U.S. Pat. No. 4,921,369 issued on May 1, 1990, to Bonnie G. Chew, II et al. describes a connector for portable furniture including a bed and a child enclosure comprising rods with keys that engage slots in the tubes of the furniture frame. The connectors are distinguishable for requiring a four- or three-sided keyed connector.

U.S. Pat. No. 5,007,220 issued on Apr. 16, 1991, to Haresh Lalvani describes a non-periodic and periodic layered space frames having prismatic nodes that are distinguishable for requiring prismatic nodes.

U.S. Pat. No. 5,499,882 issued on Mar. 19, 1996, to Robert W. Waterhouse describes a redundant joint with three-way plumbing elbows that is distinguishable for requiring three-way joint structures.

U.S. Pat. No. 5,536,063 issued on Jul. 16, 1996, in two parts for C. Cecelia C. Cable describes a collapsible recreational chair made of aluminum, steel or plastic with a flexible back support made of canvas, plastic, leather, or nylon. The chair is distinguishable for requiring metal parts.

U.S. Pat. No. 5,536,097 issued on Jul. 16, 1996, to Jacques Hazan describes an assembly system for the construction of modular furniture using a plurality of metal pipes having an orthogonal array of coplanar openings and a threaded bore at the opposite end. The modular furniture is distinguishable for requiring metal pipes.

U.S. Pat. No. 5,549,408 issued on Aug. 27, 1996, to Wei W. Lo describes a metal connector for built-up toy furniture having a circular block shape with a circular top recess for mounting a male vertical frame rod, a circular bottom recess for mounting a female vertical frame, a center through hole communicated between the circular top and bottom recesses for allowing the screw rod section of the male vertical frame rod to pass and to be threaded in the screw hole of the female vertical frame rod, a plurality of radial holes for mounting a horizontal frame rod, and a plurality of countersunk holes around the circular top recess for mounting a screw bolt to hold down each horizontal frame rod in each radial hole. The connector device is distinguishable for requiring its specific metal structure.

U.S. Pat. No. 5,598,790 issued on Feb. 4, 1997, to Preben B. Fich describes a furniture table with a tubular underframe of tubular legs. The table is distinguishable for requiring a plurality of legs.

U.S. Pat. No. 5,636,491, issued on Jun. 10, 1997, to Paul Scharer et al. describes a circular or trapezoidal furniture frame construction with several rod elements that are connected at a node point by a node element having several holes that are arranged in principal axes orthogonal in pairs. The furniture is distinguishable for requiring specific node joint elements.

U.S. Pat. No. 5,678,706 issued on Oct. 21, 1997, to Vaclav Husak et al. describes modular furniture made by laminated paper or paperboard tubes. The furniture is distinguishable for requiring paper tubes.

U.S. Pat. No. 5,918,998 issued on Jul. 6, 1999, to Tuoraj Pourmand describes a joint for three-dimensional framed structures for interior use comprising three identical shaped surfaces or wings resembling the corner of a cube having two different segments that is distinguishable for requiring a three-dimensional joint device.

U.S. Pat. No. 5,983,420 issued on Nov. 16, 1999, to Max L. Tilley describes a sleeping unit for furnishing a standardized room having two dresser units. Each dresser unit comprising a rectangular box-like frame constructed of 1×1 aluminum tubing and welded joints. The dressers are distinguishable for being made of aluminum tubing and welded joints.

German Patent Application No. DE 40 06 836 A1 published on Feb. 13, 1992, for Sigrid Reelitz describes a quick-assembly furniture kit consisting of polygonal connecting pieces and lengthwise supporting struts which can be assembled without tools by utilizing a pusher-mechanism requiring internal springs in the ends of the supporting struts. The kit is distinguishable for requiring connecting pieces with internal springs.

German Patent Application No. DE 43 02 696 A1 published on Sep. 23, 1993, for Eberhard Rensch describes a furniture kit for tables, chairs, box frames or wood, glass or plastics panels having rods with holes in through which fit connecting elements with a screw end, a cylindrical end and a cylindrical intermediate piece. The furniture kit is distinguishable for requiring rods with connecting holes.

A website publication, http://www.crawleydesign.com, noted Oct. 2, 2003, 2 pages, shows two foam models having a tag on top, a digitized table, and two printed stubs on its rear surface. The foam models are distinguishable for failing to reveal the ultimate shape of the articles.

None of the above inventions and patents, taken either singly or in combination, is seen to describe the instant invention as claimed. Thus, a life size furniture kit solving the aforementioned problems is desired.

SUMMARY OF THE INVENTION

The life size furniture kit comprises a case containing plastic deformable tubes of varying diameters and lengths, connectors, an instruction manual containing common furniture dimensions, and a videotaped instruction. The object is to help a customer how best to arrange his/her furniture according to the space provided in the empty room.

Accordingly, it is a principal object of the invention to provide a life size furniture kit from plastic tubes according to the present invention.

It is another object of the invention to provide a variety of life size furniture from plastic tubes for planning the furniture layout of a room for a customer according to the present invention.

It is a further object of the invention to provide a life size furniture layout for a customer by providing an instruction manual and a step-by-step instruction manual video according to the present invention.

Still another object of the invention is to provide a case containing all the plastic tubes, connectors, and instruction guides according to the present invention.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1A is a front perspective view of a life size seven-foot long couch frame in box form according to the present invention.

Similar reference characters denote corresponding features consistently throughout the attached drawings.

DETAILED DESCRIPTION OF THE PREFERRED EMBODIMENTS

Figure 1B:
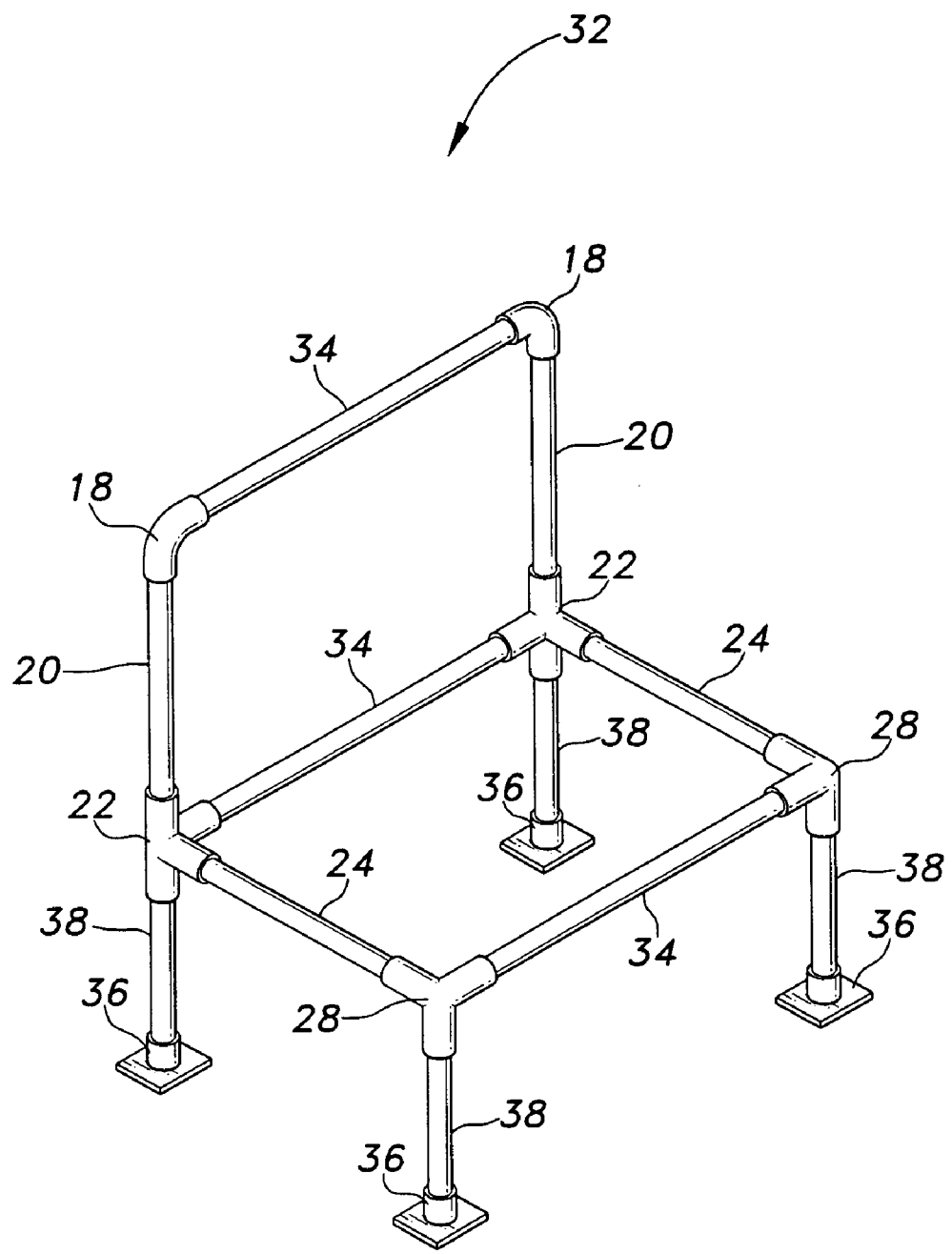
FIG. 1B is a front perspective view of a life size chair frame having floor stands for each leg according to the present invention.

The present invention is directed to a life size furniture kit consisting of an assortment of flexible transparent plastic tubes of varying diameters and lengths, an assortment of stiff plastic connectors of varying tube connecting capacities at various angles, an instruction pamphlet, and an instruction video cartridge. A prospective customer having at least one empty room to furnish with furniture can with the use of the life size furniture pieces visualize how the furniture pieces selected would be situated to one's desire.

The life size furniture made by combining the plastic tubes with an assortment of connector pieces are placed in the vacant room and moved about to the satisfaction and desire of the customer. After the customer has made his/her selections, the life size can be readily dismantled and carried away in a case.

FIG. 1 illustrates a life size seven-foot long couch frame 10 comprising five horizontal four feet long and ⅜ inch diameter plastic tubes 12 connected by connectors 14 (FIG. 2A) to three feet long plastic tubes 16. Combined tubes 14 and 16 serving as a backrest are connected by curved right-angled connectors 18 (FIG. 2B) to 1.5 feet long vertical tubes 20 at each end and to four-hole connectors 22 (FIG. 2E). This portion constitutes the seatback or backrest of the couch frame 10. The seat box portion comprises four horizontal tubes 24 two and a half feet in length joined by the previously noted two connectors 22 (FIG. 2E) in the rear and two front connectors 28 (FIG. 2F). The floor support is a similar rectangular shape 7 feet long and 2 and a half feet deep having four connectors 30 (FIG. 2F) analogous to the front connectors 28. Thus, the couch frame 10 provides the home occupant with a visual conception of how much space a future couch will take in the room.

Figure 2A:
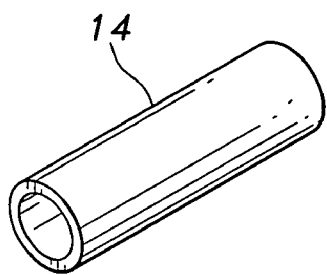
FIG. 2A is a perspective view of a short transparent plastic tube connector according to the present invention.
Figure 2B:
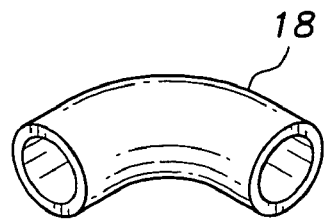
FIG. 2B is a perspective view of a transparent plastic right angle curved elbow connector according to the present invention

In FIG. 1B, a life size chair frame 32 3.5 feet in height, 3 feet in length and 2 feet in depth is depicted. Since the chair's seatback and seat have the same components as the couch 10, but lack the length, enumeration of the various elements will not be recited. However, the chair 32 has four floor stands 36 on its four legs 38. The floor stands 36 can be made of rigid plastic or metal.

Figure 1C:
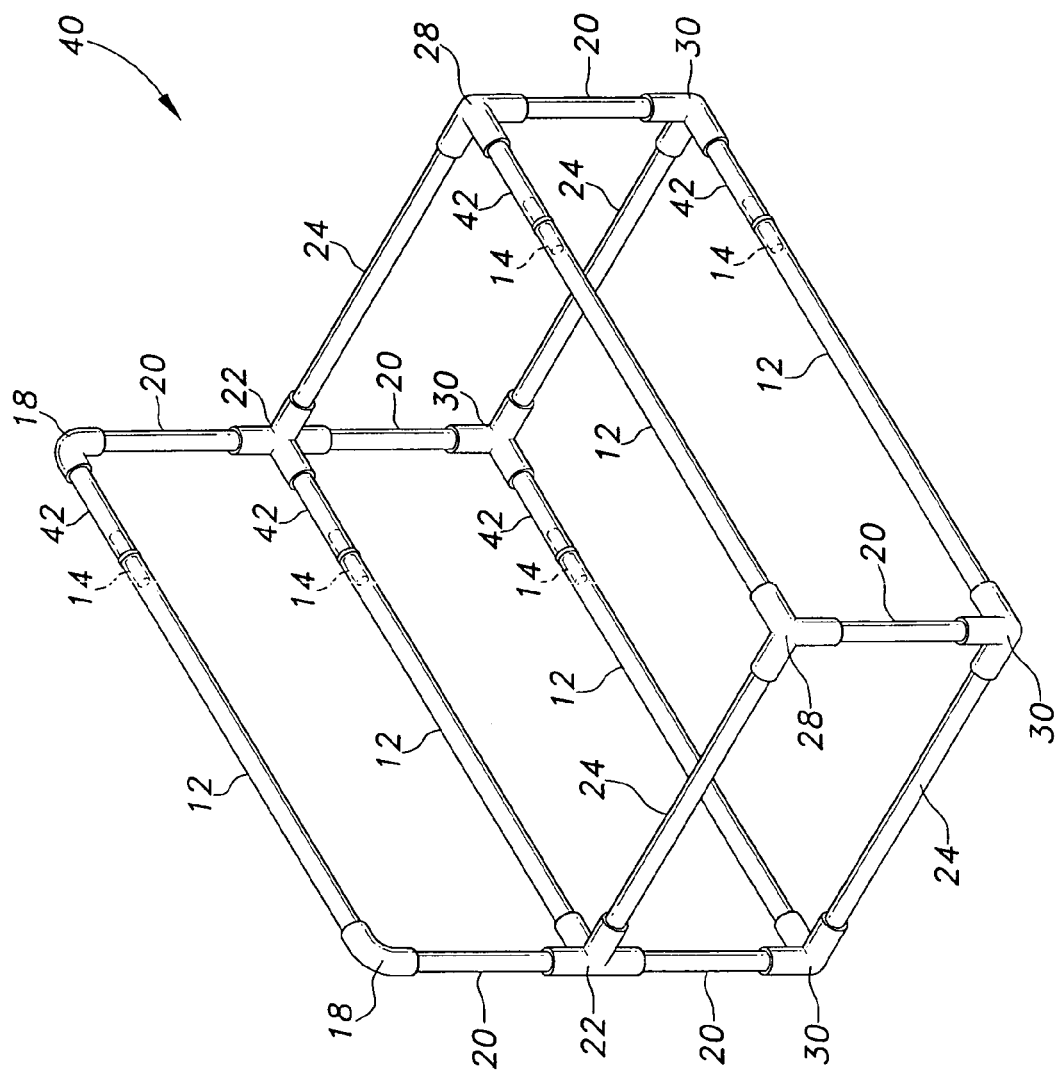
FIG. 1C is a front perspective view of a life size love seat frame in box form according to the present invention.

In FIG. 1C, a life size love seat 40 is shown similar to the FIG. 1A except that the length has been shortened to 5 feet requiring a four foot and one foot tubes connected for all the horizontal elements except the seat width tubes. Therefore, the parts will have identical reference characters except for the shorter foot long components 42.

Figure 1D:
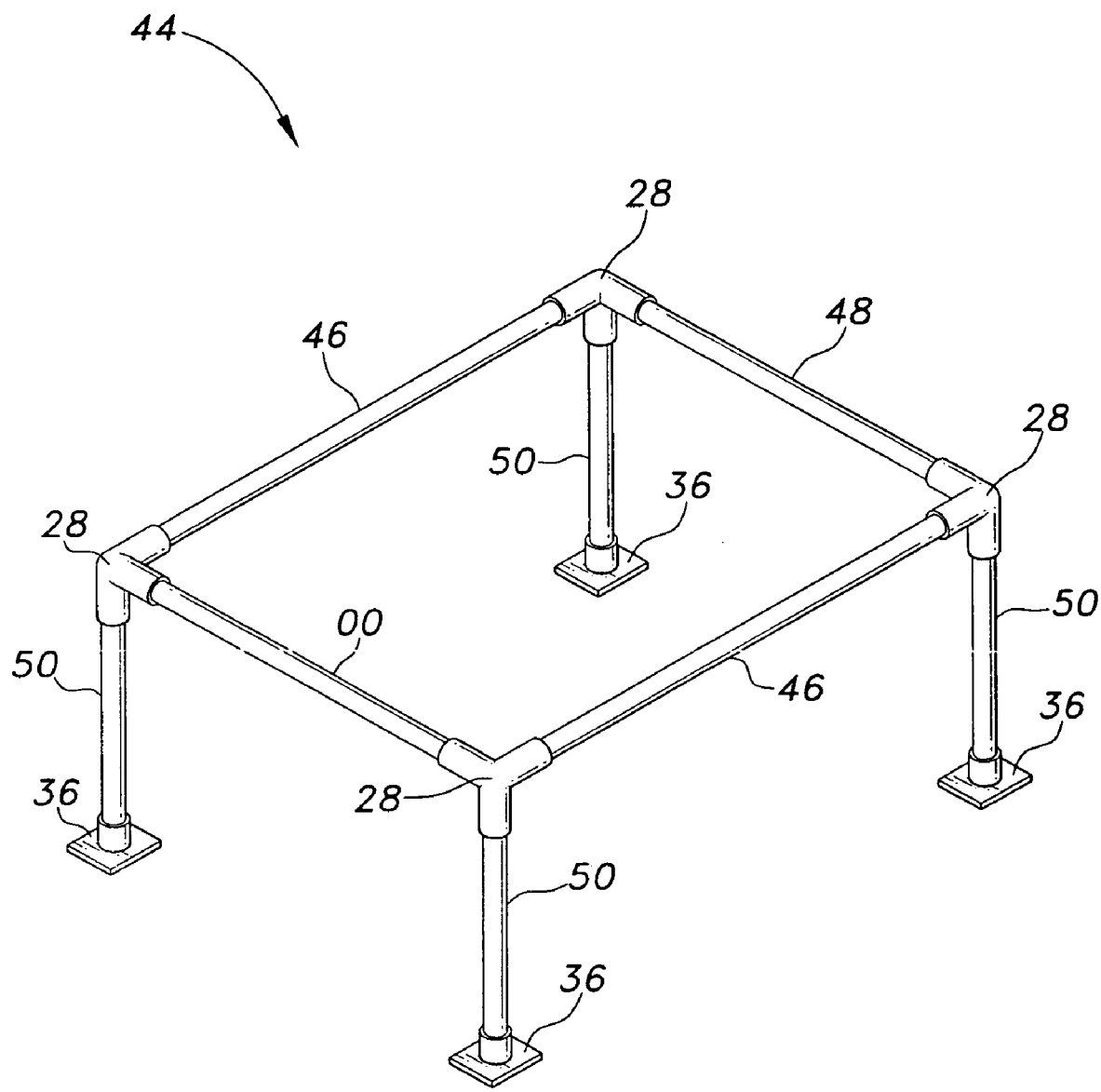
FIG. 1D is a front perspective view of a life size coffee table frame having floor stands for each leg according to the present invention.

In FIG. 1D, a life size coffee table 44 is shown having a table framework consisting of two four foot long horizontal tubes 46 and two horizontal tubes 48 having a length of two feet being joined by four connectors 28 (FIG. 2F). Each of four legs 50 are 1.5 feet long and end in the floor stands 36.

Figure 1E:
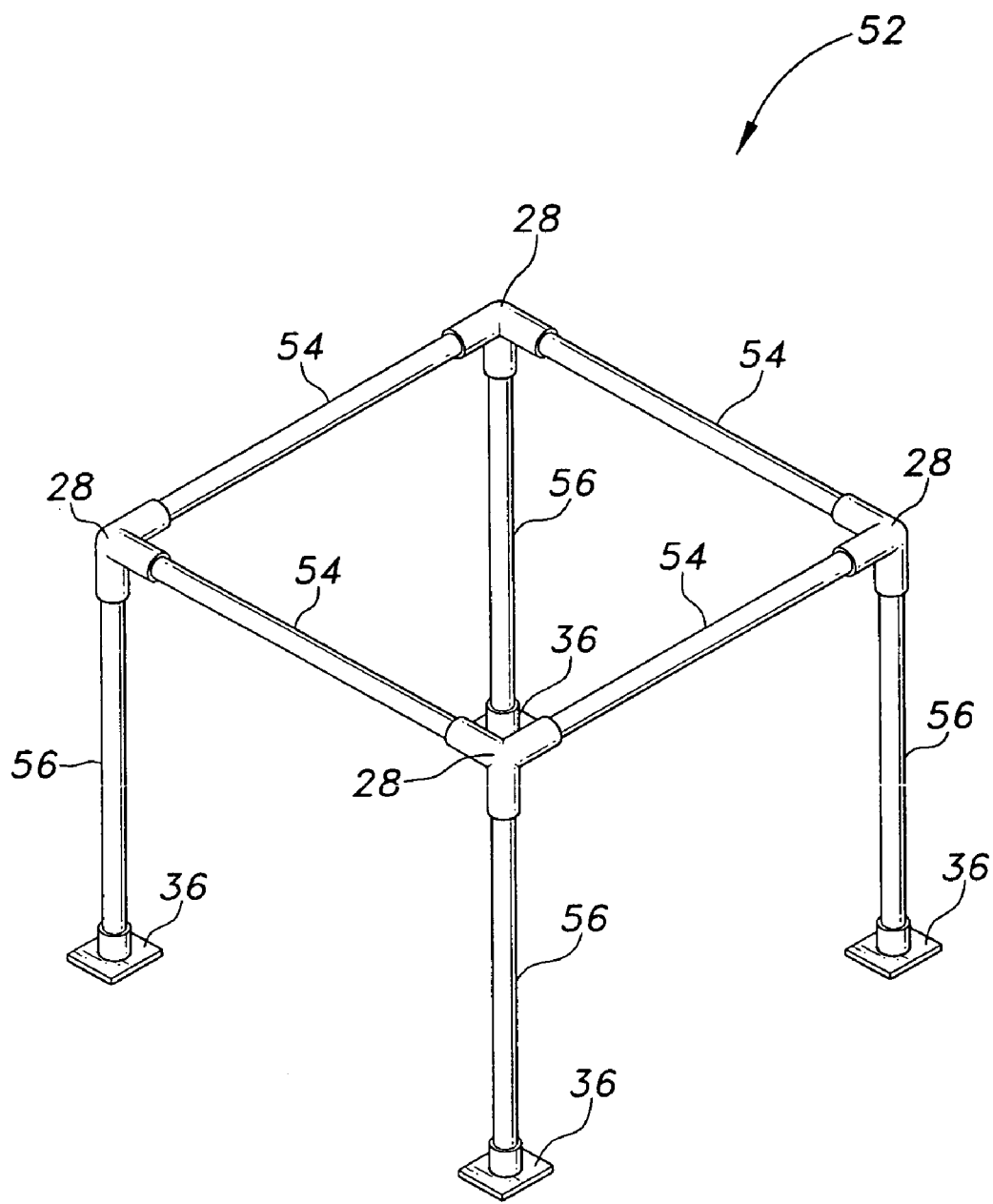
FIG. 1E is a front perspective view of a life size end table frame having floor stands for each leg according to the present invention.

In FIG. 1E, an illustration of one of two square life size end table frames 52 placed alongside the ends of the couch frame 10 is shown. The end table frame 52 has four two feet long horizontal frame elements 54 and four legs 56 three feet long supported by floor stands 36.

Figure 1F:
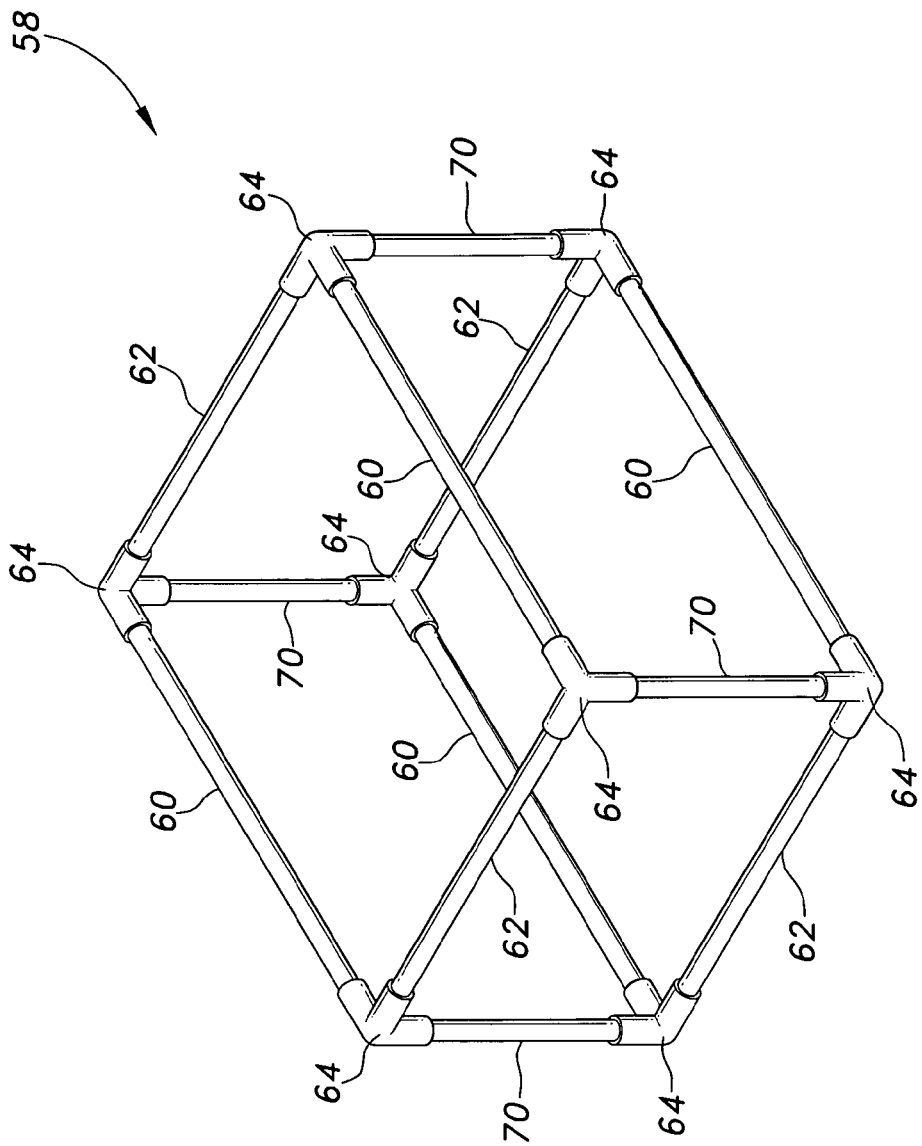
FIG. 1F is a front perspective view of a life size chest frame in box form according to the present invention.

In FIG. 1F, a life size material storing chest 58 is four feet long, three feet wide and two feet tall. The four length tubes 60 and four width tubes 62 are joined by eight FIG. 2F connectors 64.

Figure 2C:
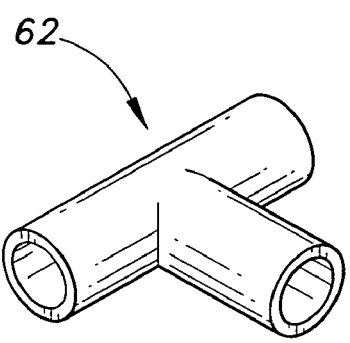
FIG. 2C is a perspective view of a transparent plastic tee-connector according to the present invention.
Figure 2D:
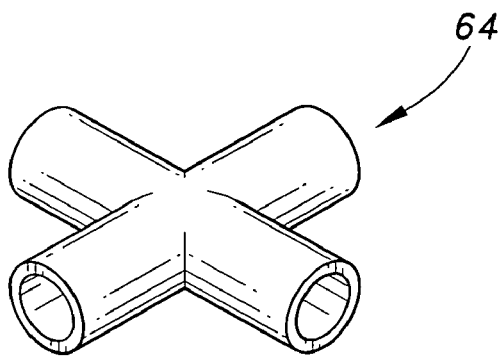
FIG. 2D is a perspective view of a transparent plastic four-hole perpendicular and in-line connector according to the present invention.
Figure 2E:
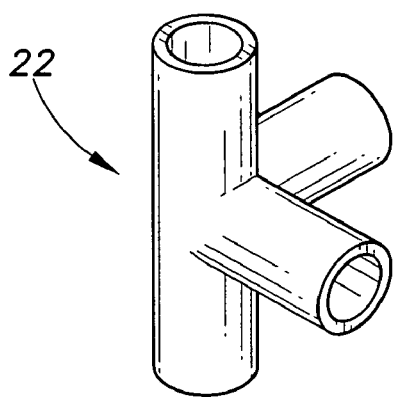
FIG. 2E is a perspective view of a transparent plastic four-hole connector, wherein two horizontal connector segments are at right angles to each other and to the vertical connector segment.
Figure 2F:
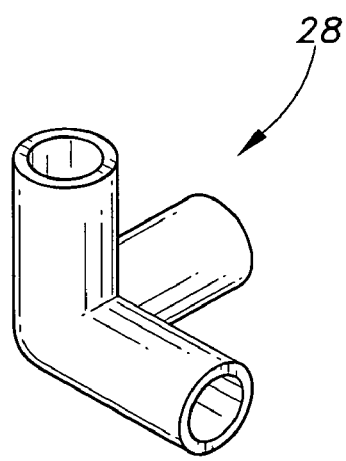
FIG. 2F is a perspective view of a transparent plastic three-hole connector, wherein a right-angled connector segment has a horizontal connector segment attached to the angle portion.
Figure 2G:
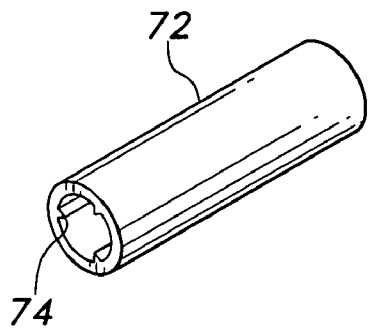
FIG. 2G is a perspective view of a cylindrical plastic connector having three longitudinal internal ridges.
Figure 2H:
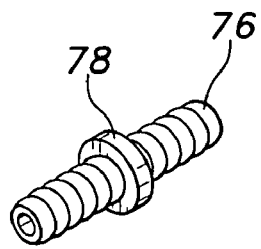
FIG. 2H is a perspective view of a threaded plastic plug connector having a centered ring.
Figure 2I:
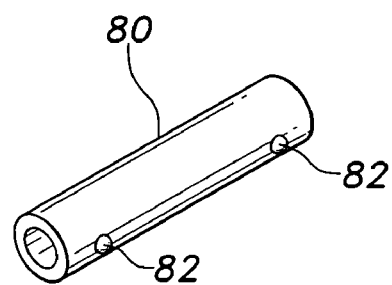
FIG. 2I is a perspective view of a plastic tubular connector having four diametrically opposed apertures for pins.
Figure 2J:
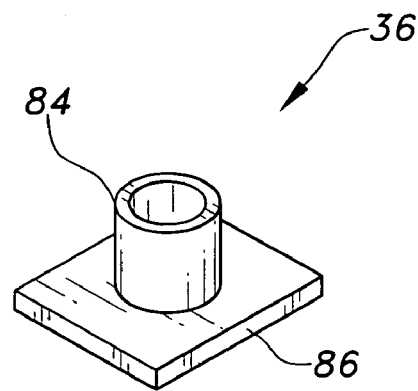
FIG. 2J is a perspective view of a plastic floor stand to support the legs of the life size furniture.
Figure 2K:
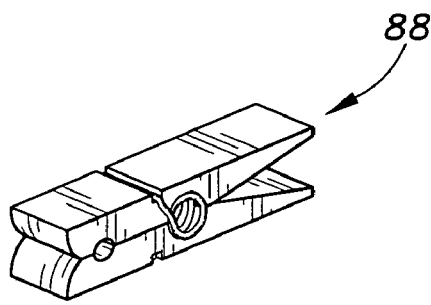
FIG. 2K is a perspective view of a plastic or wood clothes pin connector.
Figure 2L:
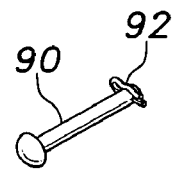
FIG. 2L is perspective view of a metal connector pin having a proximate head and a cotter pin at its distal end.

Other connectors not illustrated in the above examples are the FIG. 2C Tee connector 66 having a perpendicular tube and the FIG. 2D connector 68 having four perpendicular tubes. FIG. 2G depicts a cylindrical plastic connector 72 having three longitudinal internal ridges 74 equidistantly spaced. FIG. 2H shows a threaded tubular connector 76 having an external ring or washer 78. FIG. 2I illustrates a cylindrical connector 80 having two apertures 82. FIG. 2J depicts the floor stands 36 comprising an upright tube 84 to receive a leg and based on a flat square base 86. FIG. 2K shows a conventional wood or plastic clothespin 88. FIG. 2L illustrates a metal stud pin 90 having a cotter pin 92.

Thus, six examples of life size furniture have been shown fabricated by the seller to demonstrate to a buyer how the room will appear with the life size furniture installed. Other examples such as bookcases, desks and the like mock up room furniture can be similarly constructed and demonstrated.

It is to be understood that the present invention is not limited to the embodiments described above, but encompasses any and all embodiments within the scope of the following claims.

We claim:

1. A kit for constructing life size mock-up furniture, said kit comprising:

an assortment of flexible tubes, said assortment of flexible tubes comprising:
a plurality of first tubes, each of said first tubes being approximately four feet long;
a plurality of second tubes, each of said second tubes being approximately three feet long;
a plurality of third tubes, each of said third tubes being approximately two and one-half feet long;
a plurality of fourth tubes, each of said fourth tubes being approximately two feet long;
a plurality of fifth tubes, each of said fifth tubes being approximately one and one-half feet long;
a plurality of sixth tubes, each of said sixth tubes being approximately one foot long;
an assortment of connectors, with each connector of said assortment being configured to mate with the ends of said flexible tubes, said assortment of connectors comprising:
a plurality of first connectors, each of said first connectors being a short plastic tube;
a plurality of second connectors, each of said second connectors being a plastic right-angle tubular curved elbow;
a plurality of third connectors, each of said third connectors being a plastic tubular tee connector having three, co-planar connector tubes providing three connection points for said flexible tubes;
a plurality of fourth connectors, each of said fourth connectors being a plastic tubular cross-connector having four, coplanar connector tubes providing four connection points for said flexible tubes;

a plurality of fifth connectors, each of said fifth connectors being a plastic tubular corner connector having a pair of coplanar connector tubes providing two connection points for said flexible tubes, and a third connector tube extending normal to said pair and providing a third connection point for one of said flexible tubes;

a plurality of sixth connectors, each of said sixth connectors being a plastic tubular corner connector having a pair of coplanar connector tubes providing two connection points for said flexible tubes, and third and fourth connector tubes extending oppositely to each other and normal to said pair and providing two connection points for said flexible tubes;

a plurality of seventh connectors, each of said seventh connectors being a plastic floor stand having a base plate and a connector tube extending upwardly therefrom;

an instruction pamphlet;

an instruction video cartridge; and a case;

whereby said assortment of flexible tubes, said assortment of connectors, said instruction pamphlet and said instruction video may be stored and transported in said case, so that said kit may be carried to a prospective customer, said assortment of flexible tubes and assortment of connectors can be assembled into mock-up furniture, and the prospective customer can visualize how a room will be outfitted with various furniture.

2. The kit for constructing life size mock-up furniture according to claim 1, wherein the mock up furniture is selected from the group consisting of a couch, a chair, a love seat, a coffee table, an end table, and a chest.

3. The kit for constructing life size mock-up furniture according to claim 2, wherein the flexible tubes and connectors are transparent.

4. The kit for constructing life size mock-up furniture according to claim 1, wherein each of said flexible tubes is approximately three-eights inches in diameter.

5. The kit for constructing life size mock-up furniture according to claim 1, wherein said assortment of connectors further comprises:

a plurality of eighth connectors, each of said eighth connectors being a straight plastic tube having three inside parallel ridges equidistantly spaced; and a plurality of ninth connectors, each of said ninth connectors being a straight tube having external threads and a washer centrally disposed on said tube dividing the threaded tube into halves.

6. The kit for constructing life size mock-up furniture according to claim 5, wherein said assortment of connectors further comprises a plurality of tenth connectors, each of said tenth connectors being a straight tube having a pair of transverse apertures;

a plurality of eleventh connectors, each of said eleventh connectors being a headed metal pin having a transverse aperture with a cotter pin therethrough; and a plurality of twelfth connectors, each of said twelfth connectors being a clothespin.

* * * * *